(12) United States Patent
Yang et al.

(10) Patent No.: US 12,345,457 B2
(45) Date of Patent: Jul. 1, 2025

(54) SINGLE-STAGE CARBON DIOXIDE MULTI-SPLIT COOLING AND HEATING MULTIFUNCTIONAL CENTRAL AIR CONDITIONER

(71) Applicant: Beijing Jingkelun Engineering Design and Research Institute Co., Ltd., Beijing (CN)

(72) Inventors: Jianguo Yang, Beijing (CN); Chengjun Zhou, Beijing (CN); Weibo Xie, Beijing (CN); Quanjiang Wang, Beijing (CN); Jianhui Kang, Beijing (CN); Jilong Zhang, Beijing (CN); Hui Zhao, Beijing (CN); Lixuan Hao, Beijing (CN); Tongqin Mao, Beijing (CN); Wenjie Cao, Beijing (CN); Haiying Chao, Beijing (CN); Jiujiang Li, Beijing (CN); Xianting Zeng, Beijing (CN); Shiheng Yang, Beijing (CN)

(73) Assignee: BEIJING JINGKELUN ENGINEERING DESIGN AND RESEARCH INSTITUTE CO., LTD., Beijing (CN)

( * ) Notice: Subject to any disclaimer, the term of this patent is extended or adjusted under 35 U.S.C. 154(b) by 240 days.

(21) Appl. No.: 18/246,090

(22) PCT Filed: Sep. 14, 2021

(86) PCT No.: PCT/CN2021/118123
§ 371 (c)(1),
(2) Date: Mar. 21, 2023

(87) PCT Pub. No.: WO2022/062953
PCT Pub. Date: Mar. 31, 2022

(65) Prior Publication Data
US 2023/0221044 A1    Jul. 13, 2023

(30) Foreign Application Priority Data

Sep. 24, 2020   (CN) .......................... 202011014307.9

(51) Int. Cl.
*F25B 9/00*     (2006.01)
*A62C 35/64*    (2006.01)
(Continued)

(52) U.S. Cl.
CPC .............. *F25B 9/008* (2013.01); *A62C 35/64* (2013.01); *F24D 3/12* (2013.01); *F24H 1/52* (2013.01);
(Continued)

(58) Field of Classification Search
CPC ...... F25B 9/008; F25B 13/00; F25B 2309/06; F24D 3/12; F24H 1/52; F28D 5/00; A62C 35/64; A62C 99/0018
See application file for complete search history.

(56) References Cited

U.S. PATENT DOCUMENTS 8,166,771 B2 *  5/2012  Okamoto ................. F25B 9/06
                                                       62/512
8,176,743 B2 *  5/2012  Kurihara ................ F25B 9/008
                                                       62/190
(Continued)

FOREIGN PATENT DOCUMENTS

CN           2421597 Y     2/2001
CN         101055107 A    10/2007
(Continued)

OTHER PUBLICATIONS

European Patent Office, Extended European Search Report in EP Application No. 21871324.6, dated Sep. 12, 2024, 7 pages.
(Continued)

*Primary Examiner* — Henry T Crenshaw
(74) *Attorney, Agent, or Firm* — Schwabe, Williamson & Wyatt, P.C.

(57) ABSTRACT

A single-stage carbon dioxide multi-split cooling and heating multifunctional central air conditioner, comprising a single-stage carbon dioxide circulation system using carbon dioxide as a circulation working medium; the single-stage carbon dioxide circulation system comprises an outdoor unit and a plurality of end heat exchangers provided in parallel; and the carbon dioxide medium performs cooling and/or heating in a circulating manner in a carbon dioxide compressor, an outdoor heat exchanger, a liquid storage tank and the end heat exchangers which are in communication with one another.

16 Claims, 4 Drawing Sheets (51) Int. Cl.
F24D 3/12 (2006.01)
F24H 1/52 (2022.01)
F25B 13/00 (2006.01)
F28D 5/00 (2006.01)

(52) U.S. Cl.
CPC ............... *F25B 13/00* (2013.01); *F28D 5/00* (2013.01); *F25B 2309/06* (2013.01)

(56) References Cited

U.S. PATENT DOCUMENTS

| | | | |
|---|---|---|---|
| 2005/0279128 A1 | 12/2005 | Otake | |
| 2009/0007578 A1 | 1/2009 | Yabu | |
| 2009/0260380 A1 | 10/2009 | Okamoto | |
| 2011/0023534 A1* | 2/2011 | Kasahara | F25B 13/00 62/498 |
| 2012/0180513 A1* | 7/2012 | Yamashita | F25B 13/00 62/238.7 |
| 2013/0145786 A1* | 6/2013 | Tamaki | F24F 11/86 62/161 |
| 2015/0308700 A1* | 10/2015 | Kimura | F24F 5/0096 62/159 |
| 2016/0146488 A1* | 5/2016 | Ochiai | F24F 11/30 62/125 |
| 2022/0316779 A1 | 10/2022 | Yang et al. | |

FOREIGN PATENT DOCUMENTS

| | | |
|---|---|---|
| CN | 101055142 A | 10/2007 |
| CN | 104142033 A | 11/2014 |
| CN | 104833122 A | 8/2015 |
| CN | 204665443 U | 9/2015 |
| CN | 105477806 A | 4/2016 |
| CN | 209084936 U | 7/2019 |
| CN | 110319613 A | 10/2019 |
| CN | 110567184 A | 12/2019 |
| CN | 111197877 A | 5/2020 |
| CN | 111426089 A | 7/2020 |
| CN | 111473539 A | 7/2020 |
| CN | 111981709 A | 11/2020 |
| CN | 112325360 A | 2/2021 |
| CN | 212806110 U | 3/2021 |
| CN | 212806128 U | 3/2021 |
| CN | 213334747 U | 6/2021 |
| EP | 1816415 A2 | 8/2007 |
| JP | H0814699 A | 1/1996 |
| JP | H11211270 A | 8/1999 |
| JP | 2000105016 A | 4/2000 |
| JP | 2004257586 A | 9/2004 |
| JP | 2005147582 A | 6/2005 |
| JP | 2005337659 A | 12/2005 |
| JP | 2007263383 A | 10/2007 |
| JP | 2016114308 A | 6/2016 |
| WO | 2011/099056 A1 | 8/2011 |

OTHER PUBLICATIONS

International Search Report and Written Opinion in PCT/CN2021/118123 dated Nov. 26, 2021, 15 pages including English translation of Search Report.
Notice of Reasons for Refusal issued in Japanese Application No. 2023-518919 dated Nov. 14, 2023; 16 pages including English translation.
Australian Government—IP Australia, Examination Report No. 2 in AU Application No. 2021349807 dated May 3, 2024, 4 pages.
China Intellectual Property Administration, First Office Action in CN Application No. 202011014307.9, dated May 30, 2024, 15 pages.

* cited by examiner

SINGLE-STAGE CARBON DIOXIDE MULTI-SPLIT COOLING AND HEATING MULTIFUNCTIONAL CENTRAL AIR CONDITIONER

CROSS-REFERENCE TO RELATED APPLICATION

The present application is a national phase entry under 35 U.S.C. § 371 of International Application No. PCT/CN2021/118123, filed Sep. 14, 2021 which designates the United States of America, which claims priority to CN application No. 202011014307.9, filed Sep. 24, 2020, the entire disclosures of each of these applications are hereby incorporated by reference in their entireties and for all purposes.

FIELD

The present application relates to the field of air conditioning, in particular to a single-stage carbon dioxide multi-split cooling and heating multifunctional central air conditioner.

BACKGROUND

A central air conditioner may be installed in different areas and controlled for each of areas, and operate independently in each room for adjusting air in the areas respectively. The central air conditioner has advantages of high efficiency and energy saving, good comfort, beautiful appearance, and quiet operation, and has been more and more widely used. A multi-split mode is characterized by energy saving, low operating cost, reliable operation, good unit adaptability, and wide cooling and heating temperature range, and is suitable for commercial and civil use.

Traditional multi-split central air conditioner uses freon as a refrigeration working medium. Due to the characteristics of high density, high viscosity and small pressure difference of the freon, the traditional multi-split central air conditioner has the following defects. 1) A small number of end heat exchangers are driven, according to experience, the number of air disks of the end heat exchangers generally is less than 10, and in usage scenarios with more independent spaces, the number of outdoor units may inevitably increase, resulting in higher costs, inconvenient installation, and high maintenance costs. 2) Due to the high viscosity of freon, an indoor unit and an outdoor unit are installed with a small drop, and a piping distance is short, limiting the scope of use. 3) Heating in winter is greatly affected by the climate, in a case that an ambient temperature is lower than −5 degrees Celsius, the thermal efficiency decreases seriously, and the air conditioner may even not operate normally. Therefore, the current multi-split air conditioner is not very effective in a low-temperature heating project. In order to maintain a heating effect, the indoor unit is usually equipped with an auxiliary electric heater, which is automatically put into use, thereby energy consumption is increased. 4) The price of freon refrigerant is high, and the maintenance costs are relatively high. 5) Freon is not environmentally friendly, and the discharge of Freon into the atmosphere leads to a decrease of ozone content, causing creatures on the earth to be severely damaged by ultraviolet rays. In addition, freon, as a kind of greenhouse gas, results in an increase in temperatures in the lower stratosphere and in the troposphere. Therefore, methods and technologies for solving a problem of freon pollution are researched on. The ways to solve the problem of environmental pollution mainly include restriction and prohibition, development of substitutes and harmlessness of freon. With the increasing attention of the international community to energy conservation, emission reduction and environmental protection, the elimination of freon refrigerants has accelerated. As a safe and environmentally friendly refrigerant, carbon dioxide has a broad application prospect and considerable economic value. The applicant is committed to the research of using carbon dioxide as a refrigerant. After years of research, the use of carbon dioxide as a refrigerant can be used in the field of central air conditioners.

To sum up, it is a motivation of the present application to provide a carbon dioxide multi-split air conditioner which uses carbon dioxide as a circulating working medium of the air conditioner, has a simple structure, a low cost and a high efficiency, and is environmentally friendly.

SUMMARY

The object of the present application is to overcome the deficiencies of the conventional technology, and provide a single-stage carbon dioxide multi-split cooling and heating multifunctional central air conditioner which uses carbon dioxide as a circulating working medium of the air conditioner, has a simple structure, a high efficiency and a low cost, and is environmentally friendly. In view of the fact that the multi-split air conditioner system according to the present application uses carbon dioxide, a natural and environmentally friendly working medium, as single refrigeration working medium, a large number of end heat exchangers are driven due to a low density, low viscosity and large pressure difference of carbon dioxide.

The technical solutions of the single-stage carbon dioxide multi-split cooling and heating multifunctional central air conditioner according to the present application are described as follows.

A single-stage carbon dioxide multi-split cooling and heating multifunctional central air conditioner is provided according to an embodiment of the present application. The central air conditioner includes: a single-stage carbon dioxide circulation system using a single carbon dioxide as a circulating working medium, where the single-stage carbon dioxide circulation system includes an outdoor unit and multiple end heat exchangers arranged in parallel, and cooling and/or heating is performed by carbon dioxide medium circulating in a carbon dioxide compressor, an outdoor heat exchanger, a liquid storage tank, and the multiple end heat exchangers that are communicated with each other.

In an embodiment, the carbon dioxide compressor, the outdoor heat exchanger and the liquid storage tank constitute the outdoor unit for providing refrigerant or heat medium, each of the multiple end heat exchangers is arranged indoors for adjusting a temperature in a space, one outdoor unit is configured to tow 30 or more indoor units, the carbon dioxide medium is capable of circulating in a high-rise building at a height of 100 meters or more, and a coefficient of performance cop of the central air conditioner is greater than 4.5.

In an embodiment, the central air conditioner includes a first high-pressure four-way valve and a second high-pressure four-way valve, four ports of the first high-pressure four-way valve are respectively connected to a suction end of the carbon dioxide compressor, an exhaust end of the carbon dioxide compressor, the outdoor heat exchanger, and the multiple end heat exchangers; and four ports of the second high-pressure four-way valve are respectively connected to the outdoor heat exchanger, a liquid inlet of the liquid storage tank, a liquid outlet of the liquid storage tank, and the multiple end heat exchangers.

In an embodiment, a first one-way overflow valve is arranged at a pipeline between the liquid storage tank and the second high-pressure four-way valve.

In an embodiment, a first electronic expansion valve is arranged at a pipeline between the outdoor heat exchanger and the liquid storage tank, and a second electronic expansion valve group is connected in series to pipelines at the multiple end heat exchangers.

In an embodiment, in a cooling mode, the exhaust end of the carbon dioxide compressor and an suction end of the outdoor heat exchanger are communicated and an outlet end of each of the multiple end heat exchangers and the suction end of the carbon dioxide compressor are communicated through the first high-pressure four-way valve, an outlet end of the outdoor heat exchanger and the liquid inlet of the liquid storage tank are communicated and the liquid outlet of the liquid storage tank and an inlet end of each of the multiple end heat exchangers are communicated through the second high-pressure four-way valve, and the carbon dioxide medium successively flows through the carbon dioxide compressor, the first high-pressure four-way valve, the outdoor heat exchanger, the first electronic expansion valve, the second high-pressure four-way valve, the first one-way overflow valve, the liquid storage tank, the second electronic expansion valve group, and the multiple end heat exchangers to perform cooling, and when cooling is performed, an evaporation temperature is controlled between 6 degrees Celsius and 10 degrees Celsius to obtain a good physical effect.

In a heating mode, the exhaust end of the carbon dioxide compressor and the multiple end heat exchangers are communicated and the outdoor heat exchanger and the suction end of the carbon dioxide compressor are communicated through the first high-pressure four-way valve, the outdoor heat exchanger and the liquid storage tank are communicated and the liquid storage tank and the multiple end heat exchangers are communicated through the second high-pressure four-way valve, and the carbon dioxide medium successively flows through the carbon dioxide compressor, the first high-pressure four-way valve, the multiple end heat exchangers, the liquid storage tank, the second high-pressure four-way valve, the first electronic expansion valve, and the outdoor heat exchanger to perform heating.

In an embodiment, the central air conditioner further includes a pressure regulating device including a pressure regulating tank, where the pressure regulating tank is communicated with the liquid storage tank through a pipeline, and the pressure regulating tank is connected with a pipeline at the suction end of the carbon dioxide compressor.

In an embodiment, a third electronic expansion valve is arranged between the pressure regulating tank and the pipeline at the suction end of the carbon dioxide compressor, and a bottom of the pressure regulating tank is communicated with a top of the liquid storage tank, and a top of the pressure regulating tank is connected to the pipeline at the suction end of the carbon dioxide compressor.

In an embodiment, the central air conditioner further includes a hot water supply device connected to a pipeline at the exhaust end of the carbon dioxide compressor.

In an embodiment, the hot water supply device includes a water storage tank, a hot water pipe, a second one-way overflow valve, and a first solenoid valve, the hot water pipe is arranged in the water storage tank, two ends of the hot water pipe are connected with the pipeline at the exhaust end of the carbon dioxide compressor, the second one-way overflow valve is arranged at a pipeline at an outlet end of the hot water pipe, the first solenoid valve is arranged at the pipeline at the exhaust end of the carbon dioxide compressor, between positions at which the hot water pipe is connected to the pipeline at the exhaust end of the carbon dioxide compressor, the first solenoid valve is used to control whether to generate hot water, the water storage tank includes a cold water inlet and a hot water outlet, where cold water under a certain pressure enters the water storage tank through the cold water inlet, and water in the water storage tank exchanges heat through the hot water pipe to generate hot water.

In an embodiment, the central air conditioner includes a floor heating device, the floor heating device includes a floor heating pipe and a sixth solenoid valve, the sixth solenoid valve is connected in series to a pipeline of the floor heating pipe, and the floor heating device is connected in parallel with the multiple end heat exchangers.

In an embodiment, the central air conditioner includes an ice storage device connected in parallel with the multiple end heat exchangers, and the ice storage device includes one or more of ice storage refrigerators, ice storage freezers or ice storage cold storages connected in parallel.

In an embodiment, a fourth electronic expansion valve group is connected in series to a pipeline at the ice storage device, a second solenoid valve is arranged at an inlet pipeline of the ice storage device, a third solenoid valve is arranged at an outlet pipeline of the ice storage device, an outlet end of the ice storage device is connected to the suction end of the carbon dioxide compressor, and a fourth solenoid valve is arranged at a pipeline for connecting the outlet end of the ice storage device to the suction end of the carbon dioxide compressor.

In an embodiment, a carbon dioxide fire extinguishing device is connected at a circulation pipeline of the central air conditioner, and the carbon dioxide fire extinguishing device includes a fire-fighting pipeline and a fifth solenoid valve connected in series to the fire-fighting pipeline, where the fire-fighting pipeline is connected to a carbon dioxide circulation pipeline.

In an embodiment, the outdoor heat exchanger includes an aerosol generating device and a heat exchange pipe, aerosol in the aerosol generating device enters a heat exchanger chamber, water microclusters in the aerosol gradually decompose from large microclusters to small microclusters when absorbing radiated heat of refrigerant in the heat exchange pipe, where carbon dioxide refrigerant is condensed and liquefied by absorbing heat in a process of the aerosol decomposing from large microclusters to small microclusters, and the aerosol decomposes from large microclusters to small microclusters in a dynamic and continuous manner.

In an embodiment, the aerosol generating device includes an enclosed housing, an air extraction device and a water atomization device, the air extraction device is used to form a negative pressure in the enclosed housing, the water atomization device is used to atomize liquid water into water mist with a larger specific surface area, the atomized water and air form an aerosol in the enclosed housing under the negative pressure, the aerosol enters the heat exchange chamber for heat exchanging, and water obtained after heat exchanging is directly discharged into an atmosphere.

In an embodiment, an inner wall of the enclosed housing and/or a surface of the heat exchange pipe is coated with a water-repellent agent to prevent water droplets from hanging on the inner wall or the surface.

Embodiments of the present application have the following technical effects.

The single-stage carbon dioxide multi-split cooling and heating multifunctional central air conditioner according to the present application differs from the conventional multi-split air conditioners. The conventional multi-split air conditioners generally use a freon refrigeration system and a water circulation system being cascaded, and adjust temperature by using water circulation. In the present application, using a single-stage carbon dioxide circulation can meet the requirements of multi-split central air conditioners and an evaporation temperature is controlled by controlling a suction pressure of the carbon dioxide compressor. For example, the evaporation temperature may be controlled between 6 degrees Celsius and 10 degrees Celsius, thereby having a better physical effect. In view of the use of carbon dioxide as a circulating working medium, advantages of large pressure difference, good fluidity, low density, and transcritical phase transition are achieved. It can be used in high-rise buildings and circulate at a height of 100 meters or more, which cannot be achieved by the conventional freon multi-split central air conditioners. In addition, the conventional refrigerant medium needs to be equipped with a circulating pump, which consumes energy and has a high cost. Compared with the conventional air conditioners, with the central air conditioner according to the present application, the efficiency can be increased by more than 2 times, and energy can be saved by more than 50%.

The single-stage carbon dioxide multi-split cooling and heating multi-functional central air conditioner according to the present application can be used for multiple purposes. The hot water supply device may be installed on the pipeline at the exhaust end of the carbon dioxide compressor to generate domestic hot water. The air conditioner may be connected in series with the ice storage device. When using off-peak power to cool ice storage refrigerators, ice storage freezers or ice storage cold storages in buildings, for cold storages, refrigerators/cabinets and other low-temperature devices, the system efficiency is low and power consumption is large. To reduce the impact on the local power grid, the off-peak power is reasonably used by the cold storage technology. The air conditioner may be connected in series with the floor heating device. Carbon dioxide in the central air conditioner may also be used for fire-fighting or fire extinguishing. Carbon dioxide being used as a fire-fighting or fire extinguishing medium reduces the cost of fire protection construction. Carbon dioxide being used for fire extinguishing causes no secondary damage to objects, having a natural advantage. For storage tanks with the same volume, the amount of carbon dioxide being stored in liquid is much larger than that being stored in gas, thereby achieving a larger fire extinguishing area.

The following reference numerals are referred to in FIGS. 1 to 4.

1. carbon dioxide compressor; 2. first high-pressure four-way valve; 3. outdoor heat exchanger; 4. second high-pressure four-way valve; 5. liquid storage tank; 6. end heat exchanger; 7. first electronic expansion valve; 8. first one-way overflow valve; 9. second electronic expansion valve group; 100. pressure regulating tank; 101. third electronic expansion valve; 110. water storage tank; 111. hot water pipe; 112. second one-way overflow valve; 113. first solenoid valve; 114. cold water inlet; 115. hot water outlet; 120. floor heating pipe; 121. sixth solenoid valve; 130. fourth electronic expansion valve group; 131. second solenoid valve; 132. third solenoid valve; 133. fourth solenoid valve; 140. fire-fighting pipeline; 141. fifth solenoid valve; 150. heat exchange pipe; 151. aerosol inlet; and 152. aerosol outlet.

DETAILED DESCRIPTION

The present application is described in detail hereinafter in conjunction with the embodiments and the accompanying drawings. It should be noted that the described embodiments are only intended to facilitate the understanding of the present application, rather than limiting the present application in any way.

Referring to FIGS. 1 to 4, a single-stage carbon dioxide multi-split cooling and heating multifunctional central air conditioner according to an embodiment includes a single-stage carbon dioxide circulation system using carbon dioxide as a circulating working medium. The single-stage carbon dioxide circulation system includes an outdoor unit and multiple end heat exchangers 6 (indoor units) arranged in parallel. Cooling and/or heating is performed by carbon dioxide medium circulating in a carbon dioxide compressor 1, an outdoor heat exchanger 3, a liquid storage tank 5, and the multiple end heat exchangers 6 that are communicated with each other. Further, the central air conditioner includes a first high-pressure four-way valve 2 and a second high-pressure four-way valve 4. Four ports of the first high-pressure four-way valve 2 are respectively connected to a suction end of the carbon dioxide compressor 1, an exhaust end of the carbon dioxide compressor 1, the outdoor heat exchanger 3, and the multiple end heat exchangers 6. Four ports of the second high-pressure four-way valve 4 are respectively connected to the outdoor heat exchanger 3, a liquid inlet of the liquid storage tank 5, a liquid outlet of the liquid storage tank 5, and the multiple end heat exchangers 6. A reversing of the cooling and the heating can be realized. The single-stage is defined to differ from a cascaded system, and only carbon dioxide is used for circulation without being cascaded.

The carbon dioxide compressor 1, the outdoor heat exchanger 3 and the liquid storage tank 5 may constitute the outdoor unit for providing refrigerant or heat medium, and each of the multiple end heat exchangers 6 is arranged indoors for adjusting a temperature in a space. The carbon dioxide medium is capable of circulating in a high-rise building at a height of 100 meters or more. A coefficient of performance cop of the central air conditioner is greater than 4.5. One outdoor unit is configured to tow more than 30 indoor units, and 100 indoor units or more at most.

The carbon dioxide medium is capable of circulating in a high-rise building at a height of 100 meters or more. The coefficient of performance cop of the central air conditioner is greater than 4.5. Carbon dioxide, having a GWP of 1 and an ODP of 0, is an environmentally friendly refrigerant. Carbon dioxide has good safety and chemical stability, is non-toxic, non-flammable, and suitable for various lubricants. Carbon dioxide has good thermal properties, large cooling capacity per unit volume, low kinematic viscosity, and excellent flow and heat transfer characteristics. However, due to the low critical temperature (31.1 degrees Celsius) of carbon dioxide, it is easier to maintain in a gaseous state at an ambient temperature in summer. The critical pressure is high (7.38 MPa), and the pressure in the gaseous state is high, which results in high operating pressure and a large throttling loss of a system. Based on the characteristics of carbon dioxide, with the technical solutions of the present application, it can be ensured that the pressure in the central air conditioner is maintained within an appropriate range, and that carbon dioxide is in a liquid state at an outlet of the outdoor heat exchanger, so that the heat exchange effect in the multiple end heat exchangers 6 is better, and one host can tow more (more than 100) end heat exchangers 6, and the system is ensured to operate safely and normally.

Figure 1:
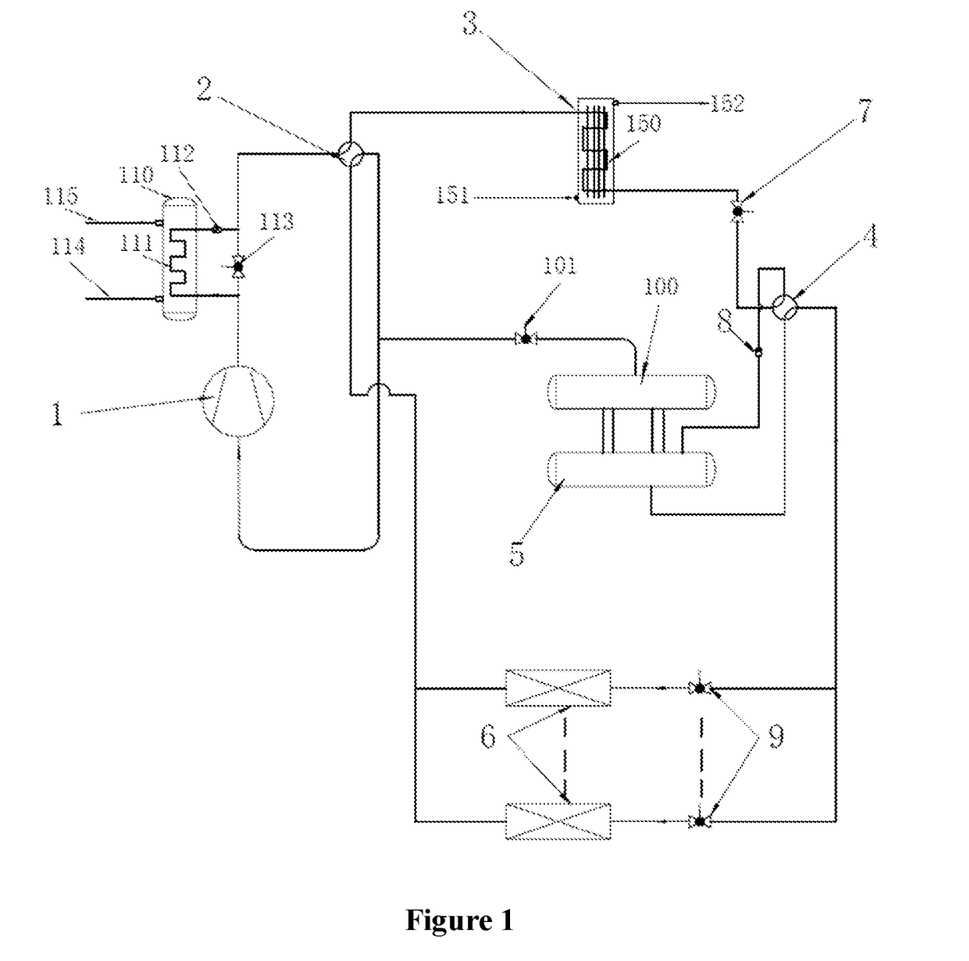
FIG. 1 is a schematic system diagram of a single-stage carbon dioxide multi-split cooling and heating multifunctional central air conditioner in a cooling mode according to an embodiment of the present application.

Referring to FIG. 1, a first one-way overflow valve 8 is arranged at a pipeline between the liquid storage tank 5 and the second high-pressure four-way valve 4. The first one-way overflow valve 8 only allows to flow in one direction, and also has a function of pressure regulation, so that the pressure in the central air conditioner can always be maintained in an appropriate range, so as to ensure the efficient operation of the system. A first electronic expansion valve 7 is arranged at a pipeline between the outdoor heat exchanger 3 and the liquid storage tank 5, thereby throttling and reducing pressure. A second electronic expansion valve group 9 is connected in series to pipelines of the end heat exchangers 6, thereby throttling and reducing pressure.

FIG. 1 is a schematic diagram of a flowing direction of carbon dioxide in a cooling mode. In the cooling mode, the exhaust end of the carbon dioxide compressor 1 and an suction end of the outdoor heat exchanger 3 are communicated and an outlet end of each of the multiple end heat exchangers and the suction end of the carbon dioxide compressor 1 are communicated through the first high-pressure four-way valve 2, an outlet end of the outdoor heat exchanger 3 and the liquid inlet of the liquid storage tank 5 are communicated and the liquid outlet of the liquid storage tank 5 and an inlet end of each of the multiple end heat exchangers 6 are communicated through the second high-pressure four-way valve 4. The carbon dioxide medium successively flows through the carbon dioxide compressor 1, the first high-pressure four-way valve 2, the outdoor heat exchanger 3, the first electronic expansion valve 7, the second high-pressure four-way valve 4, the first one-way overflow valve 8, the liquid storage tank 5, the second electronic expansion valve group 9, and the multiple end heat exchangers 6 to perform cooling. In the cooling mode, the first electronic expansion valve 7 is opened to a maximum opening degree. The second electronic expansion valve group 9 automatically adjusts an opening degree based on a predetermined superheat degree. The pressure in the liquid storage tank 5 is controlled to be constant by adjusting the opening degree of the third electronic expansion valve 101, so as to maintain the safe and efficient operation of the system.

Figure 2:
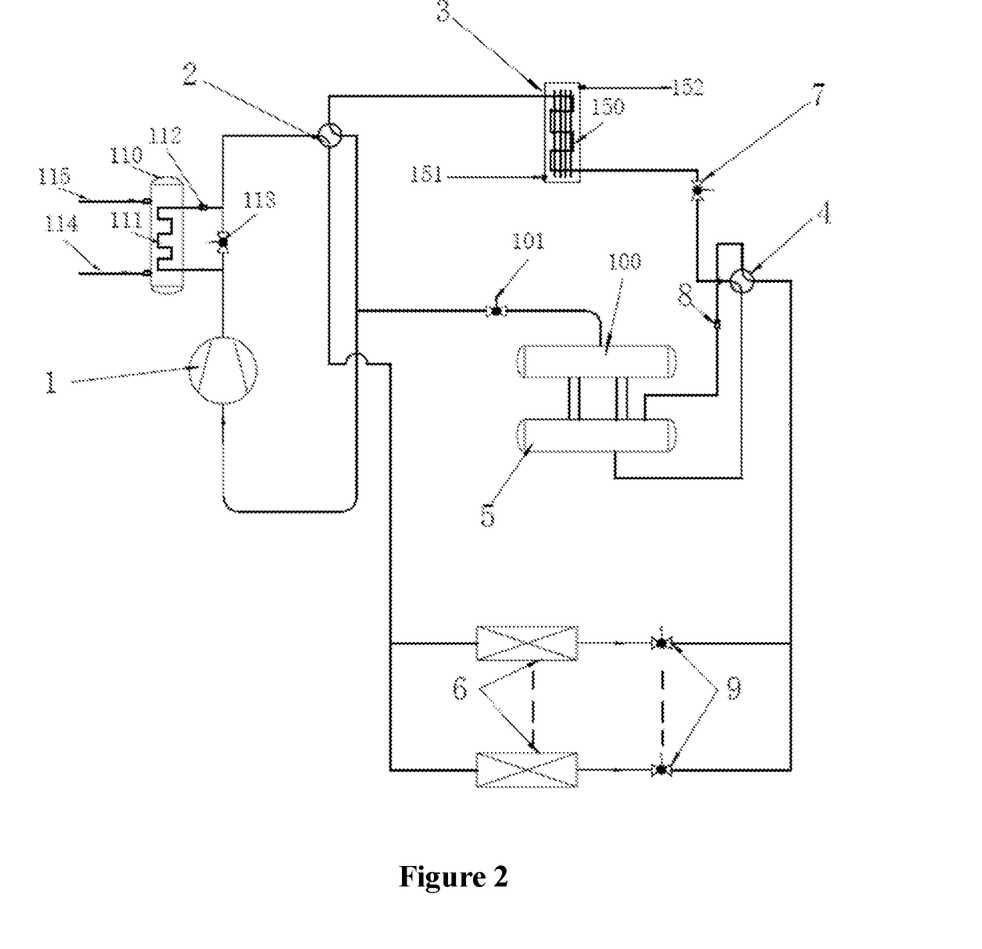
FIG. 2 is a schematic system diagram of a single-stage carbon dioxide multi-split cooling and heating multifunctional central air conditioner in a heating mode according to an embodiment of the present application.

FIG. 2 is a schematic diagram of a flowing direction of carbon dioxide in a heating mode. In the heating mode, the exhaust end of the carbon dioxide compressor 1 and the multiple end heat exchangers 6 are communicated and the outdoor heat exchanger 3 and the suction end of the carbon dioxide compressor 1 are communicated through the first high-pressure four-way valve 2, the outdoor heat exchanger 3 and the liquid storage tank 5 are communicated and the liquid storage tank 5 and the multiple end heat exchangers 6 are communicated through the second high-pressure four-way valve 4. The carbon dioxide medium successively flows through the carbon dioxide compressor 1, the first high-pressure four-way valve 2, the multiple end heat exchangers 6, the liquid storage tank 5, the second high-pressure four-way valve 4, the first electronic expansion valve 7, and the outdoor heat exchanger 3 to perform heating. In the heating mode, the second electronic expansion valve group 9 is opened to a maximum opening degree. The first electronic expansion valve 7 automatically adjusts an opening degree based on a predetermined superheat degree. The pressure in the liquid storage tank 5 is controlled to be constant by adjusting the opening degree of the third electronic expansion valve 101, so as to maintain the safe and efficient operation of the system.

The single-stage carbon dioxide multi-split cooling and heating multifunctional central air conditioner according to the present application differs from the conventional multi-split air conditioner. The conventional multi-split air conditioner generally uses a freon refrigeration system and a water circulation system being cascaded, and adjust temperature by using water circulation. In the present application, using a single-stage carbon dioxide circulation can meet the requirements of multi-split central air conditioners and an evaporation temperature is controlled by controlling a suction pressure of the carbon dioxide compressor 1. For example, the evaporation temperature may be controlled between 6 degrees Celsius and 10 degrees Celsius, thereby having a better physical effect. In view of the use of carbon dioxide as a circulating working medium, advantages of large pressure difference, good fluidity, and low density are achieved. It can be used in high-rise buildings and circulates at a height of 100 meters or more, which cannot be achieved by the conventional freon multi-split central air conditioner. In addition, the conventional refrigerant medium needs to be equipped with a circulating pump, which consumes energy and has a high cost. Compared with the conventional air conditioner, with the central air conditioner according to the present application, the efficiency can be increased by more than 2 times, and energy can be saved by more than 50%.

Figure 3:
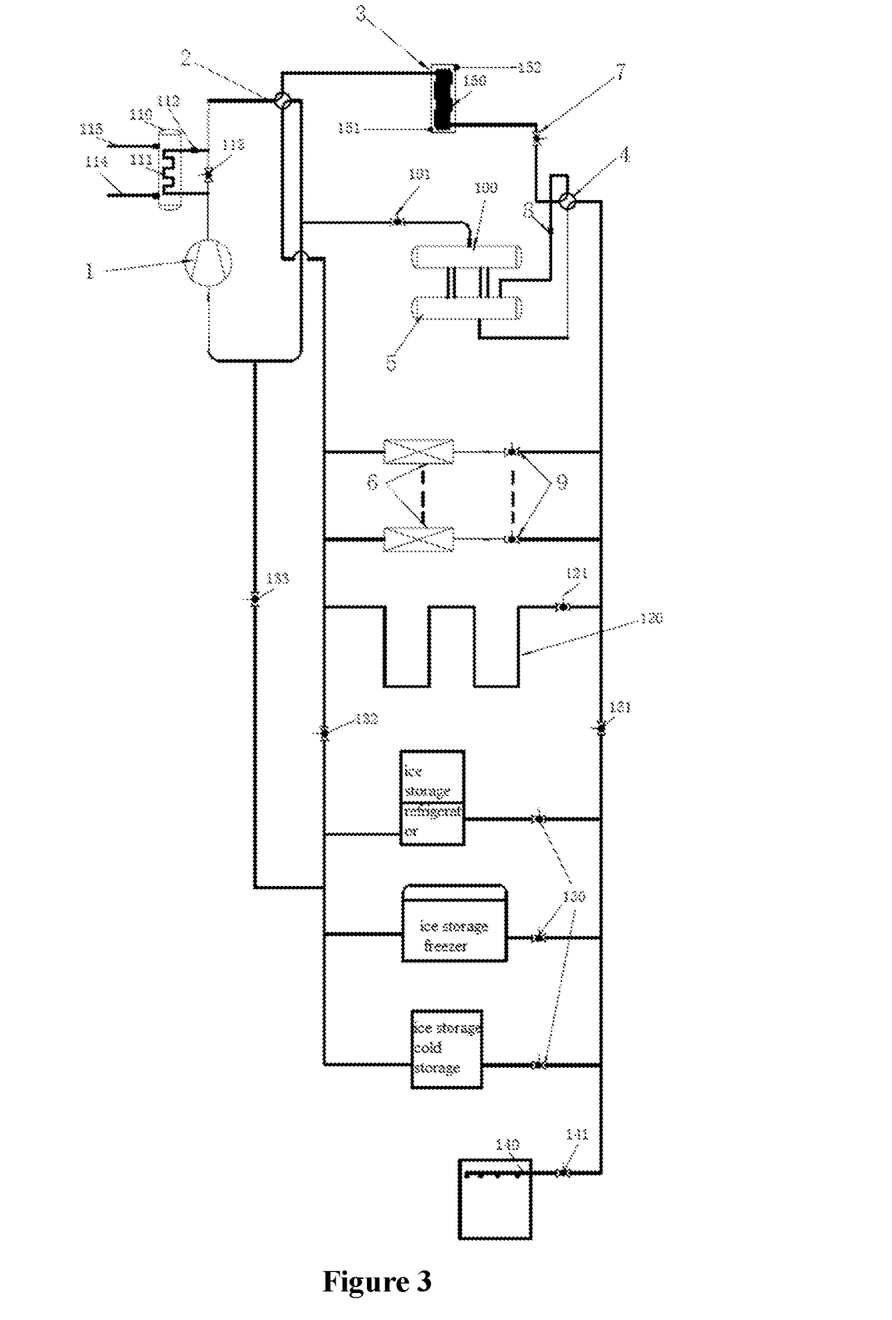
FIG. 3 is a schematic system diagram of a central air conditioner, in which a floor heating device, an ice storage device, and a fire-extinguishing device are included, in a cooling mode.
Figure 4:
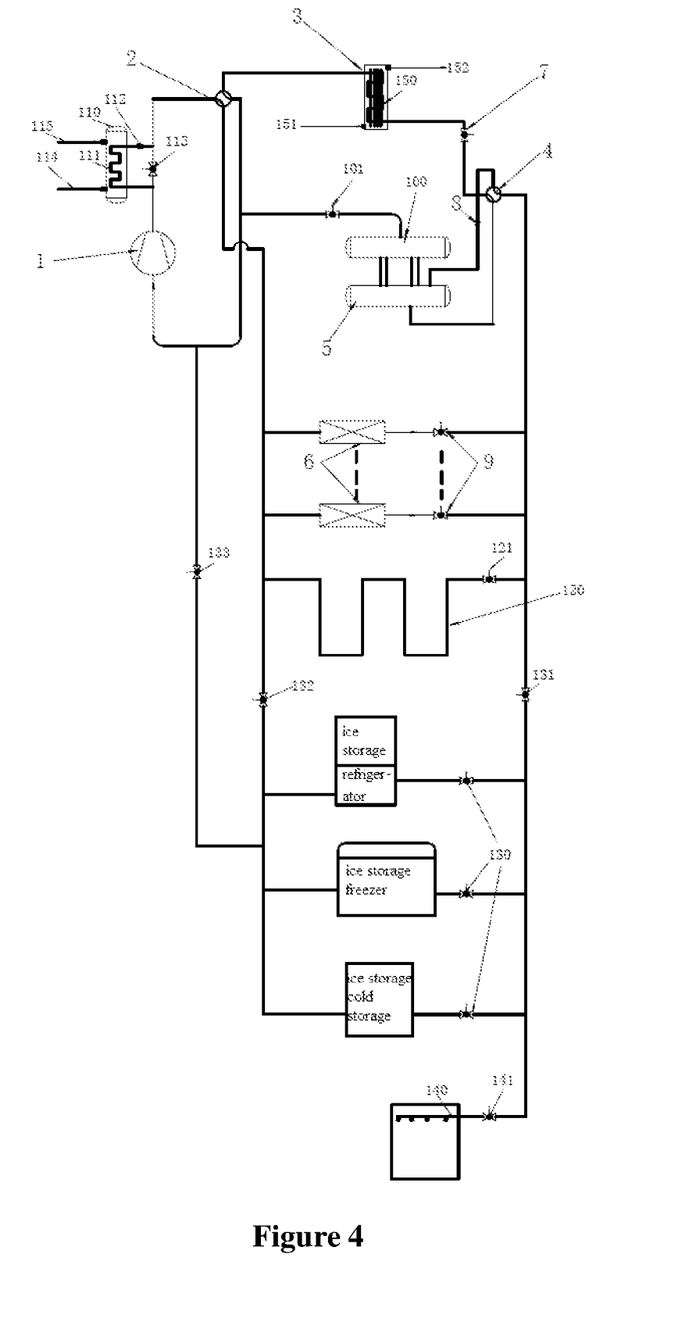
FIG. 4 is a schematic system diagram of a central air conditioner, in which a floor heating device, an ice storage device, and a fire-extinguishing device are included, in a heating mode.

Referring to FIG. 3 and FIG. 4, the single-stage carbon dioxide multi-split cooling and heating multi-functional central air conditioner according to the present application can be used for multiple purposes. The hot water supply device may be installed on the pipeline at the exhaust end of the carbon dioxide compressor 1 to generate domestic hot water. The air conditioner may be connected in series with the ice storage device. When using off-peak power to cool ice storage refrigerators, ice storage freezers or ice storage cold storages in buildings, for cold storages, refrigerators/cabinets and other low-temperature devices, the system efficiency is low and power consumption is large. To reduce the impact on the local power grid, the off-peak power is reasonably used by the cold storage technology. The air conditioner may be connected in series with the floor heating device. Carbon dioxide in the central air conditioner may also be used for fire-fighting or fire extinguishing. Carbon dioxide being used as a fire extinguishing medium reduces the cost of fire protection construction. Carbon dioxide being used for fire extinguishing causes no secondary damage to objects, having a natural advantage. For storage tanks with the same volume, the amount of carbon dioxide being stored in liquid is much larger than that being stored in gas, thereby achieving a larger fire extinguishing area.

The carbon dioxide multi-split central air conditioner according to the present application is used for actual testing. According to the data used in an actual engineering test, an office area occupies an area of 2700 m$^2$, the number of the multiple end heat exchangers 6 is 82, and the outdoor heat exchanger 3 adopts a flash type enclosed heat exchanger. The outdoor heat exchanger 3 occupies an area of 2000 m$^2$, and only three 15-horsepower carbon dioxide compressors 1 with a condensation load of 200 KW are required. When the ambient temperature is 34 degrees Celsius and the evaporation pressure is 45 bar, the condensation pressure is stable and below 80 bar, and a coefficient of performance cop of the system is in a range of 4.5 to 5.5. The coefficient of performance cop of the system may reach 6 at night, which is much higher than the coefficient of performance of the conventional freon system. According to experimental observations, the number of the multiple end heat exchangers driven by the carbon dioxide multi-split air condition may be hundreds of units.

Referring to FIG. 3, the central air conditioner further includes a pressure regulating device. The pressure regulating device includes a pressure regulating tank 100, the pressure regulating tank 100 is communicated with the liquid storage tank 5 through a pipeline, and the pressure regulating tank 100 is connected with a pipeline at the suction end of the carbon dioxide compressor 1. With the operation of the system, the pressure of the liquid storage tank 5 increases. In a case that the pressure in the liquid storage tank 5 is higher than a critical value, there will be non-liquid high-density gas in the liquid storage tank 5, the cooling capacity will be greatly reduced, and the increased pressure reduces the safety of the system. On the other hand, it is required to provide more pressure-resistant parts, which increases the manufacturing cost. With the above structure, in a case that the pressure in the liquid storage tank 5 is too high, the liquid storage tank 5 and the pressure regulating tank 100, the carbon dioxide compressor 1, and the outdoor heat exchanger 3 form a small cycle, which can reduce the pressure in the liquid storage tank 5 and further refrigerate. In addition, the pressure regulating tank 100 can store the refrigerant in liquid, so that the refrigerant in liquid will not enter the carbon dioxide compressor 1 rotating in a high-speed, thereby avoiding damage to the carbon dioxide compressor 1. The pressure regulating tank 100 has a second effect: when the central air conditioner is shut down for a long time in summer, the liquid in the liquid storage tank 5 changes in density due to heat absorption. For example, the liquid storage tank 5 stores a liquid at 28 degrees Celsius (the density is 655.28 kg/m$^3$) when the central air conditioner is shut down, and the pressure is a corresponding saturation pressure, when being shut down or being subjected to environmental thermal radiation, the pressure in the pipe reaches 35 degrees Celsius and 80 bar, the density is about 419.09 kg/m$^3$. According to the principle of conservation of mass, additional space is required for storage of the expanding fluid. By arranging the pressure regulating tank 100, the problem of liquid expansion when the central air conditioner is shut down is solved. A third electronic expansion valve 101 is arranged between the pressure regulating tank 100 and the pipeline at the suction end of the carbon dioxide compressor 1. By arranging the third electronic expansion valve 101, the pressure in the liquid storage tank 5 can be precisely controlled below a critical point, and the temperature in the tank is a saturation temperature corresponding to the tank pressure or has a certain subcooling temperature, and the system operates more efficiently. In an embodiment, a bottom of the pressure regulating tank 100 is communicated with a top of the liquid storage tank 5, makes it easier for the gas in the liquid storage tank 5 to enter the pressure regulating tank 100. A top of the pressure regulating tank 100 is connected to the pipeline at the suction end of the carbon dioxide compressor 1.

Referring to FIGS. 3 and 4, the central air conditioner further includes a hot water supply device connected to a pipeline at the exhaust end of the carbon dioxide compressor 1. The hot water supply device includes a water storage tank 110, a hot water pipe 111, a second one-way overflow valve 112, and a first solenoid valve 113, and the hot water pipe 111 are arranged in the water storage tank 110. Two ends of the hot water pipe 111 are connected with the pipeline at the exhaust end of the carbon dioxide compressor 1, and the second one-way overflow valve 112 is arranged at a pipeline at an outlet end of the hot water pipe 111, to avoid the backflow of the low-temperature carbon dioxide medium and act to control the pressure. The first solenoid valve 113 is arranged at the pipeline at the exhaust end of the carbon dioxide compressor 1, between positions at which the hot water pipe 111 is connected to the pipeline at the exhaust end of the carbon dioxide compressor 1. The first solenoid valve 113 is used to control whether to generate hot water. The water storage tank 110 includes a cold water inlet 114 and a hot water outlet 115, where cold water under a certain pressure enters the water storage tank 110 through the cold water inlet 114, and water in the water storage tank 110 exchanges heat through the hot water pipe 111 to generate hot water above 60 degrees Celsius. The hot water outlet 115 is connected to a domestic water pipeline. In a case that hot water needs to be generated, the first solenoid valve 113 is closed, and the hot gas from the carbon dioxide compressor 1 passes through the hot water pipe 111 to prepare hot water, and then flows to the heat exchanger through the one-way overflow valve. In a case that the temperature of the hot water reaches a set requirement, the first solenoid valve 113 is opened, and the hot gas from the carbon dioxide compressor 1 flows directly to the outdoor heat exchanger 3. The hot water pipe 111 may be a coiled pipe or a finned pipe to increase the heat exchange area. It should be noted that in a case that the central air conditioner needs to perform refrigeration, the hot water supply device can cool down the hot gas of carbon dioxide, increase the heat exchange efficiency of the heat exchanger, and can provide domestic hot water, and also reduce the cooling burden on the refrigeration system, thereby being very energy efficient.

Referring to FIG. 3 and FIG. 4, the central air conditioner includes a floor heating device. The floor heating device includes a floor heating pipe 120 and a sixth solenoid valve 121. The sixth solenoid valve 121 is connected in series to a pipeline at the floor heating pipe 120. The floor heating device and the multiple end heat exchangers 6 are connected in parallel, and the carbon dioxide medium of the central air conditioner can circulate in the floor heating pipe 120. In a case that the sixth solenoid valve 121 is opened, the first electronic expansion valve 7 automatically adjusts the opening degree based on a predetermined superheat degree to realize heating.

Referring to FIG. 3 and FIG. 4, the central air conditioner includes an ice storage device connected in parallel with the multiple end heat exchangers 6. The carbon dioxide medium of the central air conditioner can circulate in the ice storage device. The ice storage device includes one or more of ice storage refrigerators, ice storage freezers, and ice storage cold storages connected in parallel. A fourth electronic expansion valve group 130 is connected in series to a pipeline at the ice storage device, and automatically adjusts the opening degree based on a predetermined superheat degree to achieve cooling. A second solenoid valve 131 is arranged at an inlet pipeline of the ice storage device, and a third solenoid valve 132 is arranged at an outlet pipeline of the ice storage device. The outlet end of the ice storage device is connected to the suction end of the carbon dioxide compressor 1, and a fourth solenoid valve 133 is arranged at a pipeline for connecting the outlet end of the ice storage device to the suction end of the carbon dioxide compressor. The second solenoid valve 131, the third solenoid valve 132 and the fourth electronic expansion valve group 130 cooperate to realize the following functions. 1) The second solenoid valve 131, the third solenoid valve 132 and the fourth electronic expansion valve group 130 are opened in a case that refrigeration is required to be performed in the ice storage device, to realize the circulation of carbon dioxide refrigerant in the ice storage device. 2) A cooling capacity required by the multiple end heat exchangers 6 is greatly reduced at night, and the second solenoid valve 131 and the fourth electronic expansion valve group 130 may be opened and the third solenoid valve 132 may be closed to store cold for the ice storage device. When using off-peak power to cool ice storage refrigerators, ice storage freezers or ice storage cold storages in buildings, for cold storages, refrigerators/cabinets and other low-temperature devices, the system efficiency is low and power consumption is large. To reduce the impact on the local power grid, the off-peak power is reasonably used by the cold storage technology. That is, the second solenoid valve 131, the fourth solenoid valve 133, and the fourth electronic expansion valve group 130 are opened. When heating at the end of the air conditioner or heating at the floor, and the off-peak power is still needed to cool the ice storage device at night, the ice storage device and the outdoor heat exchanger are connected in parallel. In this case, the third solenoid valve 132 is closed, and the second solenoid valve 131 and the fourth solenoid valve 133 are opened.

Referring to FIG. 3 and FIG. 4, a carbon dioxide fire extinguishing device is connected to a circulation pipeline of the central air conditioner, and the carbon dioxide fire extinguishing device includes a fire-fighting pipeline 140 and a fifth solenoid valve 141 connected in series with the fire-fighting pipeline 140. The carbon dioxide in the refrigeration system is used as a fire-extinguishing medium to reduce the cost of fire protection construction. Carbon dioxide being used for fire extinguishing has no secondary damage to objects, having a natural advantage. For storage tanks with the same volume, the amount of carbon dioxide being stored in liquid is much larger than that being stored in gas, thereby achieving a larger fire extinguishing area. As a natural working medium, carbon dioxide has a characteristic of being difficult to burn and explode. The characteristic can be used to extinguish fires in building areas. When it is judged by a smoke sensor or temperature sensor in a room that a fire has occurred, the fifth solenoid valve 141 in the room and the second solenoid valve 131 at a main liquid supply pipeline are opened to allow liquid carbon dioxide to enter the room through a nozzle to extinguish the fire. In a case that the concentration in the room reaches a predetermined value, the second solenoid valve 131 and the fifth solenoid valve 141 are closed.

Referring to FIG. 3 and FIG. 4, the outdoor heat exchanger 3 includes an aerosol generating device (not shown in the figure) and a heat exchange pipe 150. The aerosol from the aerosol generating device enters the heat exchange chamber, and water microparticles in the aerosol gradually decompose from large microclusters to small microclusters when absorbing radiant heat of refrigerant in the heat exchange pipe 150. Carbon dioxide refrigerant is condensed and liquefied by absorbing heat in a process of the aerosol decomposing from large microclusters to small microclusters, and the aerosol decomposes from large microclusters to small microclusters in a dynamic and continuous manner.

The aerosol generating device includes an enclosed housing, an air extraction device and a water atomization device. The air extraction device is used to form a negative pressure in the enclosed housing, and the water atomization device is used to atomize liquid water into water mist with a larger specific surface area. The atomized water and air form the aerosol in the enclosed housing under the negative pressure, and the aerosol enters the heat exchange pipe 150 from an aerosol inlet 151 for heat exchanging. The water obtained after heat exchanging is not circulated and recycled, and is directly discharged into the atmosphere through an aerosol outlet 152. Since the heat is mainly converted into internal energy during the decomposition process of the aerosol, the temperature of the discharged water mist is not high, and no heat island effect will occur. Moreover, the water will not pollute the environment, and while being environmentally friendly, the cost is reduced. There are three ways of heat exchange: convection, conduction, and radiation. The high-temperature carbon dioxide in the heat exchange pipe 150 of the present application is a heat exchange mode in which small microclusters in the aerosol are decomposed by using the radiant heat and heat is taken away, thereby greatly improving the heat exchange efficiency.

It should be noted that, unlike the conventional air-cooled heat exchangers and evaporative heat exchangers, for the outdoor heat exchanger of the present application, under the condition of negative pressure, the aerosol gradually decomposes from large microclusters into small microclusters with being subjected to the radiation heat, to perform heat exchange. The heat exchange is not affected by high temperature and high humidity conditions, and can be used normally under different climatic conditions.

In addition, since the volume of water atomized into mist droplets becomes smaller, it is easier to disperse and float, which speeds up the fluidity of the mist droplets and heat exchange with the outdoor heat exchanger 3 can be quickly performed. In addition, most of the mist droplets with a small volume in the direct-contact heat exchange process absorb heat and evaporate into vapor, thereby greatly improving the coefficient of performance.

As an example, an inner wall of the enclosed housing and/or a surface of the heat exchange pipe is coated with a water-repellent agent. The water-repellent agent is a pollution-free and harmless super-hydrophobic material, and is used to prevent huge water droplets formed by collision and combination of the sprayed-out small water drops from attaching to the inner wall of the enclosed housing and the surface of the heat exchanger, to prevent the water droplets from hanging on the inner wall and the surface and prevent the heat exchange efficiency from being affected.

In the description of the present application, it should be noted that the orientation or positional relationships indicated by terms such as "front/back", "up/down", "left/right", "vertical/horizontal", "inner/outer" and the like are based on the orientation or positional relationships shown in the drawings, and are merely for the convenience of describing the present application and the simplification of the description, and do not indicate or imply that the device or element referred to must have a particular orientation, or be configured and operated in a particular orientation, and therefore should not be construed as a limitation to the scope of the present application. In addition, terms such as "first", "second", "third" and the like are merely for description, and should not be construed as indicating or implying relative importance. For the convenience of description, the "left", "right", "up" and "down" referred to below are consistent with the left, right, up, and down directions of the drawings, but they do not limit the structure of the present application.

In the description of the present application, it should be noted that, unless otherwise explicitly specified and defined, terms such as "installation", "link", "connection", "communication" should be understood in a broad sense, for example, the terms may imply a fixed connection, a detachable connection, or an integral connection; a mechanical connection or an electrical connection; a direct connection, an indirect connection through an intermediate medium, or an internal communication between two components. For those skilled in the art, the specific meaning of the above terms in the present application should be understood in the light of specific circumstances.

Finally, it should be noted that, the above embodiments are only used for illustration of the technical solutions of the present application rather than limitation to the protection scope of the present application. Although the present application has been illustrated in detail with reference to the preferred embodiments, it should be understood by those skilled in the art that, modifications or equivalent replacements may be made to the technical solutions of the present application without departing from the essence and scope of technical solutions of the present application.

The invention claimed is:

1. A single-stage carbon dioxide multi-split cooling and heating multifunctional central air conditioner, comprising:
   a single-stage carbon dioxide circulation system using carbon dioxide as a circulating working medium, wherein the single-stage carbon dioxide circulation system comprises an outdoor unit and a plurality of end heat exchangers, the plurality of end heat exchangers are arranged in parallel, and cooling and/or heating is performed by the carbon dioxide circulating in a carbon dioxide compressor, an outdoor heat exchanger, a liquid storage tank, and the plurality of end heat exchangers, wherein the carbon dioxide compressor, the outdoor heat exchanger, the liquid storage tank, and the plurality of end heat exchangers are communicated with each other;
   wherein the central air conditioner comprises a first high-pressure four-way valve and a second high-pressure four-way valve, four ports of the first high-pressure four-way valve are respectively connected to a suction end of the carbon dioxide compressor, an exhaust end of the carbon dioxide compressor, the outdoor heat exchanger, and the plurality of end heat exchangers; and four ports of the second high-pressure four-way valve are respectively connected to the outdoor heat exchanger, a liquid inlet of the liquid storage tank, a liquid outlet of the liquid storage tank, and the plurality of end heat exchangers.

2. The single-stage carbon dioxide multi-split cooling and heating multifunctional central air conditioner according to claim 1, wherein the carbon dioxide compressor, the outdoor heat exchanger and the liquid storage tank constitute the outdoor unit for providing refrigerant or heat medium, each of the plurality of end heat exchangers is arranged indoors for adjusting a temperature in a space, one outdoor unit is configured to drive 30 or more indoor units.

3. The single-stage carbon dioxide multi-split cooling and heating multifunctional central air conditioner according to claim 1, wherein a first one-way overflow valve is arranged at a pipeline between the liquid storage tank and the second high-pressure four-way valve.

4. The single-stage carbon dioxide multi-split cooling and heating multifunctional central air conditioner according to claim 1, wherein a first electronic expansion valve is arranged at a pipeline between the outdoor heat exchanger and the liquid storage tank, and a second electronic expansion valve is connected in series to a pipelines at each of the plurality of end heat exchangers.

5. The single-stage carbon dioxide multi-split cooling and heating multifunctional central air conditioner according to claim 1, wherein
   in a cooling mode, the exhaust end of the carbon dioxide compressor and a suction end of the outdoor heat exchanger are communicated and an outlet end of each of the plurality of end heat exchangers and the suction end of the carbon dioxide compressor are communicated through the first high-pressure four-way valve, an outlet end of the outdoor heat exchanger and the liquid inlet of the liquid storage tank are communicated and the liquid outlet of the liquid storage tank and an inlet end of each of the plurality of end heat exchangers are communicated through the second high-pressure four-way valve, and the carbon dioxide successively flows through the carbon dioxide compressor, the first high-pressure four-way valve, the outdoor heat exchanger, the first electronic expansion valve, the second high-pressure four-way valve, the first one-way overflow valve, the liquid storage tank, the second electronic expansion valves, and the plurality of end heat exchangers to perform cooling;
   in a heating mode, the exhaust end of the carbon dioxide compressor and the plurality of end heat exchangers are communicated and the outdoor heat exchanger and the suction end of the carbon dioxide compressor are communicated through the first high-pressure four-way valve, the outdoor heat exchanger and the liquid storage tank are communicated and the liquid storage tank and the plurality of end heat exchangers are communicated through the second high-pressure four-way valve, and the carbon dioxide successively flows through the carbon dioxide compressor, the first high-pressure four-way valve, the plurality of end heat exchangers, the liquid storage tank, the second high-pressure four-way valve, the first electronic expansion valve, and the outdoor heat exchanger to perform heating.

6. The single-stage carbon dioxide multi-split cooling and heating multifunctional central air conditioner according to claim 1, wherein the central air conditioner further comprises a pressure regulating device comprising a pressure regulating tank, the pressure regulating tank is communicated with the liquid storage tank through a pipeline, and the pressure regulating tank is connected with a pipeline at the suction end of the carbon dioxide compressor.

7. The single-stage carbon dioxide multi-split cooling and heating multifunctional central air conditioner according to claim 6, wherein a third electronic expansion valve is arranged between the pressure regulating tank and the pipeline at the suction end of the carbon dioxide compressor, and a bottom of the pressure regulating tank is communicated with a top of the liquid storage tank, and a top of the pressure regulating tank is connected to the pipeline at the suction end of the carbon dioxide compressor.

8. The single-stage carbon dioxide multi-split cooling and heating multifunctional central air conditioner according to claim 1, wherein the central air conditioner further comprises a hot water supply device connected to a pipeline at the exhaust end of the carbon dioxide compressor.

9. The single-stage carbon dioxide multi-split cooling and heating multifunctional central air conditioner according to claim 8, wherein the hot water supply device comprises a water storage tank, a hot water pipe, a second one-way overflow valve, and a first solenoid valve, the hot water pipe is arranged in the water storage tank, two ends of the hot water pipe are connected with the pipeline at the exhaust end of the carbon dioxide compressor, the second one-way overflow valve is arranged at a pipeline at an outlet end of the hot water pipe, the first solenoid valve is arranged at the pipeline at the exhaust end of the carbon dioxide compressor, between positions at which the hot water pipe is connected to the pipeline at the exhaust end of the carbon dioxide compressor, the first solenoid valve is used to control whether to generate hot water, the water storage tank comprises a cold water inlet and a hot water outlet, wherein cold water under a certain pressure enters the water storage tank through the cold water inlet, and water in the water storage tank exchanges heat through the hot water pipe to generate hot water.

10. The single-stage carbon dioxide multi-split cooling and heating multifunctional central air conditioner according to claim 1, wherein the central air conditioner comprises a floor heating device, the floor heating device comprises a floor heating pipe and a sixth solenoid valve, the sixth solenoid valve is connected in series to a pipeline of the floor heating pipe, and the floor heating device is connected in parallel with the plurality of end heat exchangers.

11. The single-stage carbon dioxide multi-split cooling and heating multifunctional central air conditioner according to claim 1, wherein the central air conditioner comprises an ice storage device connected in parallel with the plurality of end heat exchangers, and the ice storage device comprises one or more of ice storage refrigerators, ice storage freezers or ice storage cold storages connected in parallel.

12. The single-stage carbon dioxide multi-split heating and cooling multifunctional central air conditioner according to claim 11, wherein a fourth electronic expansion valve is connected in series to a pipeline at the ice storage device, a second solenoid valve is arranged at an inlet pipeline of the ice storage device, a third solenoid valve is arranged at an outlet pipeline of the ice storage device, an outlet end of the ice storage device is connected to the suction end of the carbon dioxide compressor, and a fourth solenoid valve is arranged at a pipeline for connecting the outlet end of the ice storage device to the suction end of the carbon dioxide compressor.

13. The single-stage carbon dioxide multi-split cooling and heating multifunctional central air conditioner according to claim 1, wherein a carbon dioxide fire extinguishing device is connected at a circulation pipeline of the central air conditioner, and the carbon dioxide fire extinguishing device comprises a fire-fighting pipeline and a fifth solenoid valve connected in series to the fire-fighting pipeline, wherein the fire-fighting pipeline is connected to a carbon dioxide circulation pipeline.

14. The single-stage carbon dioxide multi-split cooling and heating multifunctional central air conditioner according to claim 1, wherein the outdoor heat exchanger comprises an aerosol generator and a heat exchange pipe, aerosol in the aerosol generator enters a heat exchanger chamber, water microclusters in the aerosol gradually decompose from large microclusters to small microclusters when absorbing radiated heat of refrigerant in the heat exchange pipe, wherein carbon dioxide refrigerant is condensed and liquefied by absorbing heat in a process of the aerosol decomposing from large microclusters to small microclusters, and the aerosol decomposes from large microclusters to small microclusters in a dynamic and continuous manner.

15. The single-stage carbon dioxide multi-split cooling and heating multifunctional central air conditioner according to claim 14, wherein the aerosol generator comprises an enclosed housing, an air pump and an atomizer, the air pump is used to form a negative pressure in the enclosed housing, the atomizer is used to atomize liquid water into water mist with a larger specific surface area, the atomized water and air form an aerosol in the enclosed housing under the negative pressure, the aerosol enters the heat exchange chamber for heat exchanging, and water obtained after heat exchanging is directly discharged into an atmosphere.

16. The single-stage carbon dioxide multi-split cooling and heating multifunctional central air conditioner according to claim 15, wherein an inner wall of the enclosed housing and/or a surface of the heat exchange pipe is coated with a water-repellent agent to prevent water droplets from hanging on the inner wall or the surface.

* * * * *